3,359,103
CONVERSION OF PHOTOGRAPHIC PHOTO-
CHROMIC IMAGE TO PERMANENT FIXED
CHROMOGENIC IMAGE
William J. Becker and Peter L. Foris, Kettering, Ohio,
assignors to The National Cash Register Company,
Dayton, Ohio, a corporation of Maryland
No Drawing. Filed Feb. 28, 1966, Ser. No. 530,388
16 Claims. (Cl. 96—27)

ABSTRACT OF THE DISCLOSURE

This invention relates to fixing an ultraviolet light image in a film layer having dispersed therein photochromic material (benzo-indolinospiropyrans and 3-aroyl-2-methyl chromones) and colorless chromogenic material (leucauramines, acyl auramines, Rhodamine B lactams, styryl dyes, and 4,4′,4″,4‴ (oxydimethylidene) tetrakis (N, N dimethylanaline) compounds, by subjecting the layer to an electron-acceptor gas ($SO_2$, $I_2$, boron trichloride), followed by heating to cause an acid-base reaction.

---

This invention relates to photo-imagery employing ultraviolet light, photochromic material, basic chromogenic material that yields color in an acid-base reaction, and a gas for forming a complex with the ultraviolet-light-irradiated photochromic material, that complex in turn reacting with the chromogenic material to produce a new fixed color image product.

This application is a continuation-in-part of United States patent application Ser. No. 429,146, filed Jan. 29, 1965, now abandoned.

The irradiated photochromic material produces a color of itself which may or may not be of the same visible color hue as that of the chromogenic material, as they are of different molecular origin.

This invention as a product provides a layer of film material in which images may be made in a precursor evanescent first colored product form by use of ultraviolet light and in a fixed form of the first product by application of a reactive gas aided by applied heat to form a permanent image of a distinctively colored reactant second product occupying the same image area as the first product.

The invention as a process consists of the acts required to form the precursor image comprising the first product, and the final image comprising the second product of the same image conformation.

The utility of the invention resides in the convenience of the process in being a "dry" process, requiring no applied liquid material and a minimum of equipment; in the possibility of performing the process in a single step or alternatively as a series of steps, depending on the initial presence or not of reactive gas; and in the requirement, in most cases, for more than ambient heat to make the reactions "go" quickly. The utility of the invention further resides in the ability to erase and re-form the precursor image and in the persistence of the sensitivity of the background area to ultraviolet light.

The layer preferably is made of polymeric film-forming material initially having interspersed therein molecules of the selected photochromic material and molecules of the selected chromogenic material of basic properties, which yield the distinctively colored second product on undergoing an acid-base reaction. By definition, a photochromic material molecularly dispersed yields a color by reversible molecular rearrangement when irradiated by ultraviolet light, and the colored state has been found to combine readily with $SO_2$, but such is not the case with the normal uncolored state, to which the colored state slowly reverts through the action of ambient heat as a function of temperature increase from absolute zero. Photochromic materials that are operative at normal room temperature (70 to 75 degrees Fahrenheit) are known in great numbers. Basic chromogenic materials also are known that yield color when undergoing acid-base reaction and that are reactive in the environment of the process, and will be specified by groups.

The chromogenic material need not be present in the film until the photochromic image has been formed, as will be described, and the layer without the chromogenic material component constitutes the beginning layer in the process in one form of the invention.

Eligible photochromic materials have the property of combining with $SO_2$ to form the complex product which converts the basic chromogenic material to its acid-base colored form without more being done except to adjust the temperature upwardly from room temperature to make the reaction "go" in a reasonably short time to be considered in seconds.

Other gases, notably iodine vapor and boron trichloride, are useful substitutes in a minor way for $SO_2$ but are more difficult to handle from a safety point of view.

The materials may be mixed as to kinds to produce desired image products as to color and durability. That is to say, one or more eligible photochromic materials may be used conjointly with one or more eligible chromogenic materials, and one or more gases, to produce combined results in an additive sense.

If the chromogenic material is not present at the time the photochromic image is made, it may be applied to the layer by solution application after the image is formed from the photochromic content of the layer by application of the ultraviolet light and after fixation by the reactive gas.

It is considered that the unused layer of film material with both the photochromic material and the chromogenic material content, in the uncolored form, itself constitutes a merchantable product useful for making stable colored images by performing therewith the steps of the invention process of, in order, (a) applying to the layer ultraviolet light in image-representing patterns, (b) general exposure of the layer to $SO_2$ vapor (or equivalent reactive gas), and (c) heating the layer if the ambient temperature is not sufficient to make the acid-base color-forming reaction "go" in the required time period to make the system commercially useful.

It also is considered that the layer of film material containing the chemical complex image of the photochromic compound and $SO_2$ (or equivalent reactive gas), with or without the presence of the chromogenic basic material, is a merchantable product, as it may in that form be processed, after being supplied with the chromogenic material, followed with application of the necessary heat to make the reaction "go" and thus form a stabilized second colored image for final use.

The total process is unique and of importance in that in the preferred embodiment no applied liquids are required in the practice of it, and in that the intermediate products are not subject to damage by ordinary ambient light or atmospheric exposure.

One unique feature of the invention is that, as has been said, the photochromic material itself undergoes a visible color change when exposed to ultraviolet light, which color is incidental to the color of the final product and which may be of different hue, so that the precursor image outline is readily apparent before the process step of exposure to the reactive gas, the step of the application of chromogenic material if not already present, or the step of heating (if necessary) are performed.

It is contemplated that the layer may be placed in the reactive gas environment before the application of ultraviolet light or simultaneously with the application of ultraviolet light, to save a separate process step. If the basic chromogenic material is present, the final product is formed by consecutive reactions requiring but the one active step of an operator in applying ultraviolet light to delineate the precursor image, the process being automatic from there to completion, if the temperature is correct.

The background area of the layer (that is to say, the area not occupied by the image area) will remain sensitive to ultraviolet light if the photochromic material is not dissolved away in the process of later applying chromogenic material by use of a solvent liquid solution, so that images may thereafter be made in those unused areas. Also, it has been the experience that the potential for photochromic imagery in a given area is not necessarily wholly used up by the making of a first photochromic image, and, therefore, a second overlying photochromic image may be made which can extend across the borders of and blend with the image of the used areas if not exhausted.

All of this flexibility of processing and use without resort to liquid media, unless the chromogenic material is added after the photochromic image is made, is matched by the speed of operation in forming the finished stable chromogenic image product, which should require (under favorable conditions) only a minute or so to complete.

The untreated photochromic image, before fixation by the reactive gas, is reversible at will with applied long wave length light or by elevation of temperature of the layer. If no reversible operativeness is required or contemplated, the image may be formed by ultraviolet light in the reactive gas atmosphere, so that, once the photochromic image product is formed, it is forthwith started on its conversion to an irreversible gas complex image with the chromogenic material by environmental heat. This, as has been pointed out, will amount to performance of the two image-formation steps of illumination and acid gas fixing without movement of the layer of film material or effecting a change in its environment, although the chemical phenomena occur successively.

The processing can be automated easily with self-supporting polymer film in the form of chips, slides, or bands, or with glass-supported or otherwise supported coatings in the form of chips or strips either rigid or flexible in physical state, if moved environmentally to processing areas suitable for initiating the reactions. For instance, processing can be carried on with respect to a continuously moving support film for the layer, which first is subjected to a data-representing trace of ultraviolet light, then passed into a chamber where the photochromic image is fixed in the reactive gas, and thence passed through a heating zone if necessary, as no problem of registry or exact positioning is involved. In recording mechanisms provided with a roll of the novel film material, a continuous colored trace could be made without pens or ink or other marking material applicator. Nothing is necessary except a data-controlled beam of ultraviolet light, a gas-supplied chamber, and a heating roller over which the gas-fixed film passes.

Of the photochromic materials available for use in the practice of this invention, thousands of the benzoindolinospiropyran class are known which are eligible candidates for use as the photochromic material content of this invention. These compounds have the general formula

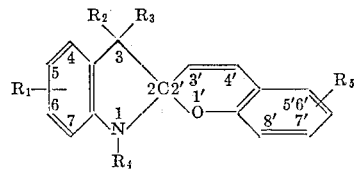

where the substituents $R_1$, $R_2$, $R_3$, $R_4$, and $R_5$ determine the reaction rates of the conversion of the material in solution from the colorless state to the colored state in response to the application of ultraviolet light and vice versa in response to ambient temperature. Among those compounds disclosed hereinafter and considered, without limitation, as superior for use in the preferred form of the invention are those identified by the following substitutions:

$R_1$ = one or more of the following in the 4, 5 6, or 7 position: H, Cl, F, $\phi$, OMe
$R_2$ = $CH_3$, $\phi$, propyl
$R_3$ = $CH_3$, $\phi$, propyl
$R_4$ = $CH_3$, $\phi$, isoamyl
$R_5$ = one or more of the following in the 5′, 6′, 7′, or 8′ position: H, Cl, Br, I, F, $NO_2$, CN, CHO, OMe, OEt, $CH_3$ Another class of compounds of photochromic materials having one or more members eligible for use in the practice of this invention is of the substituted 3-aroyl-2-methylchromone type which is fixed in the colored state assumed when struck by ultraviolet light. These compounds have the general formula:

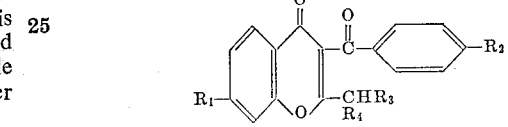

where $R_1$, $R_2$, $R_3$, and $R_4$ determine the reaction rates of the conversion of the material in solution from the colorless state to the colored state in response to the application of ultraviolet light. Among those compounds disclosed hereinafter and considered eligible for use in this invention are those identified with the following substitutions:

$R_1$ = H or $N(CH_3)_2$
$R_2$ = H or CN
$R_3$ = phenyl, p-methoxyphenyl, p-hydroxyphenyl
$R_4$ = H or phenyl The specific naming of these compounds is not to be deemed limiting as to eligibility of other photochromic materials that react with gases to form a complex that behaves as an acid. These photochromic materials in ultraviolet-light-induced colored form in solution generally have a strong blue hue which changes to pale yellow on conversion into the complex with the gas. These colored precursor images indicate to the operator that the ultraviolet light has been effective, and give to the operator the thus-recorded image content for checking.

The gas-converted photochromic image product material behaves as if it were a material with an acidity of a pKa higher than 3.3, and, therefore, the basic chromogenic material is chosen with such in mind. The principle of testing the acidity of a substance in a layer or other solid form is published in an article, "Acidity of Catalyst Surfaces, I. Acid Strength from Colors of Adsorbed Indicators," by H. A. Benesi, published in J. Am. Chem. Soc. 78–5490 (1956), explaining the use of Hammett Indicators for determining the acid strength of solid catalyst surfaces; but that article does not anticipate the way of use of materials disclosed in this application, nor is it concerned with the art of fixing photochromic images. The publication does present a known method of testing materials for acidity (and strength) in nonaqueous systems according to a pKa number. Care must be taken in interpreting this pKa designation, as p has a negative connotation. In some publications, Hammett Indicators are given in values which must be converted to the opposite algebraic sign to represent pKa values.

The chromogenic compounds useful with this invention are those which change from a substantially colorless state to a highly colored state in the presence of a substance that acts as if it were acidic. Already-colored chromogenic compounds which change from one color to another, or from a less intense color to a more intense color or vice versa are also useful, but may not be as desirable due to the ultraviolet-light-filtering action of the material in the unconverted state, and the poor visual contrast of the final image as compared to the initial color in the background. In addition, the chromogenic materials useful with this invention are limited to those capable of changing color in the presence of the acid-acting complex substance formed from the colored photochromic material and the reactant gas. This complex has acidic properties, but is not highly acidic; therefore, chromogenic materials which require the presence of a strong acid are not useful in practicing this invention.

If the acidic image is tested with the so-called "Hammett Indicators" (which are well known to anyone skilled in the art), the image evidences the properties of a substance which has a pKa higher than 3.3. Therefore, chromogenic materials which require a pKa of 3.3 or lower should not be used. Chromogenic materials which function at a higher pKa will be useful in practicing this invention.

A further limitation is placed on the chromogenic materials eligible for use by the fact that the system of the invention is essentially non-aqueous, so that those chromogenic materials which require the presence of water for a change of color are not expected to function. Finally, any chromogenic material chosen must be compatible with the other materials necessary to practice the invention; and it must dissolve in the coating mixture and remain dispersed (not separate) upon the evaporation of solvent to form the solidified film layer.

Among the basic chromogenic materials eligible for use in the process are organic solvent soluble:

(1) Leucauramines: Represented by the N-halophenyl derivatives of leucauramine disclosed in United States Letters Patent No. 2,828,341, issued to Clyde S. Adams, Marjorie J. Cormack, and Mary Lou Frazier on March 25, 1958, particularly N-(2,5-dichlorophenyl) leucauramine disclosed therein; and the N-alkylhalophenyl derivatives of leucauramine disclosed in United States Letters Patent No. 2,828,342, issued to Clyde S. Adams and Marjorie J. Cormack on March 25, 1958, said patents being incorporated herein by reference for what they disclose, (2) Acyl auramines: Represented by N-benzoyl auramine and N-acetyl auramine, (3) Rhodamine B Lactams: Represented by N-(p-nitrophenyl) Rhodamine B Lactam, (4) Styryl dyes: Represented by 4-(p-dimethylaminostyryl) quinoline, and 2-(p-dimethylaminostyrly) quinoline, and (5) 4,4',4'',4''' (oxydimethylidyne) tetrakis (N,N dimethyl analine).

These chromogenic compounds, after undergoing reaction with the gas-derived image material, range from blue to red in color, depending on the particular compound or mixture of compounds used. The requirement of more than room temperature to make the reactions "go" also depends on the materials. The N-phenyl Rhodamine B Lactam, for instance, is red in the reacted form and needs no artificially-applied heat to cause its development if it is allowed to stand at room temperature for ten to fifteen minutes. This development action can be speeded up to occur within a few seconds by heating the layer to 200 degrees Fahrenheit. The temperature of above 200 degrees Fahrenheit is all that is necessary to convert any of the eligible compounds by acid-base reaction with the gas complex to the colored form in a matter of seconds, in thin films. A time factor is involved in the permeation of the gas and the heat into the film layer, and this must be taken into account when dealing with films thicker than .001 to .003 of an inch.

The ultraviolet light source should be strong in the 3660 angstrom line, such as is the characteristic of the radiation which is derived from a mercury arc.

Generally, the commonly-used film-forming organic polymeric materials are soluble in the same solvents as are the photochromic materials, and as are the basic chromogenic materials. These solvents preferably are so chosen that they evaporate at room temperature, leaving a solid film having the molecules of the reactive materials dispersed in it. Eligible combinations of solvents and film-forming polymeric materials for use in practicing the invention with the specified photochromic and chromogenic materials are listed for convenience, without limitation being implied, as they are in wide use commercially for forming films, and the choice of equivalent combinations is well within the skill of one familiar with the art:

|  | Toluene | Benzene | Xylene | Acetone | Methylethyl Ketone | Ethyl Acetate |
|---|---|---|---|---|---|---|
| Polystyrene | X | X | X |  | X | X |
| Cellulose Acetate Butyrate |  |  |  | X | X | X |
| Polymethacrylate Esters | X | X | X | X | X | X |
| Cellulose Acetate |  |  |  | X | X | X |

The films formed with the specified materials generally should be as thin as possible (.001 to .002 inch) to allow the ready permeation of the reactive gas therethrough and to assure high resolution of the image. If the film is to be self-supporting, and thus thicker, the gas permeation necessarily is slower in passing through the thickness of the photochromic image, but such in no way interferes with the gas image which is formed part way in depth by the traversing ultraviolet light. The colored remainder of any gas-unconverted ultraviolet-light-induced image will disappear through the action of ambient heat applied in the heating step or by the environmental temperature of living conditions.

EXAMPLE I

An ordinary glass microscope slide is coated with a 10% solution of Acryloid B-72 methacrylate polymeric material in benzene having dissolved therein 2% of N(2,5-dichlorophenyl)leucauramine and 2% of the 6'NO$_2$ derivative of the benzoindolinospiropyran compound for which the structural formula has been given, the percentages being by weight based on the weight of the polymeric material solution. The dried coating preferably should be within the specified thickness of .001 to .003 of an inch. This slide is exposed, in the desired areas, according to the data to be represented, to ultraviolet light rich in the 3660 angstrom spectrum region until the image appears blue in incident white light. This may take a fraction of a second or longer, depending on the energy of the ultraviolet light source. This blue image persists for an hour or so, depending on the ambient room temperature (70 to 75 degrees Fahrenheit) and before reversion to the colorless state is exposed to SO$_2$ gas, as by immersing the slide in a beaker supplied with a flowing supply of the gas. Again, depending upon ambient or adjusted temperature, degree of gas-saturation of the ambient atmosphere, and the permeability of the film material to SO$_2$, the SO$_2$ complex with the light-activated photochromic material is formed within a few seconds and makes its presence observable by a yellowing of the blue image partially or in toto, depending on light and gas exposure times. This yellowish complex reacts with the basic chromogenic molecules to form a compound of a visibly blue color which, as is apparent, is derived from a different substance from that which gave color to the image area by exposure of the photochromic material to ultraviolet light. This acid-base reaction between the $SO_2$ image and the basic chromogenic material is speeded by a temperature rise and is most expeditiously carried out by heating the slide to between 200 and 210 degrees Fahrenheit. The image which results is as stable as any colored dye product formed by acid-base reactions involving the same chromogenic material.

Only one photochromic material and one chromogenic material so far have been specified for this embodiment of the invention, in order to evidence and emphasize its simplicity in terms of the number of components; and the photochromic material and the chromogenic material were specified as both being present in the film at the time of its exposure to ultraviolet light. It is a fact that mixtures of different photochromic materials may be used with one chromogenic material and vice versa, and that several photochromic materials may be used in conjunction with a mixture of chromogenic materials, as desired, as there is no generalized problem of interfering reactions. In the use of numbers of different kinds of reactive materials together, the principle of the invention is not changed except that the results of the various reactions, being merely mixtures of individual reaction products, give to the precursor and final images a blend of properties as to persistence, hue, reversion rate, and the like, all of which are predictable from the results obtained by reactions between individual selected pairs of photochromic and basic chromogenic materials and adding them together.

While each combination of eligible ingredients could yield a different example of the invention from that standpoint, such would amount to repetition and would not contribute to a further understanding of the invention, and, hence, the remaining examples are directed toward process steps or systems involving the inventive principle.

EXAMPLE II

A glass slide is made with a layer coating in the manner of Example I except that initially the chromogenic material is omitted. The photochromic image is made in the layer with ultraviolet light, and, before the image has spontaneously disappeared, due to the ambient temperature, the layer is exposed to $SO_2$ as in Example I. The slide is then dipped in a saturated solution of the chromogenic material in a mixture of 90 milliliters to 10 milliliters of hexane/benzene (or any other mixture of these such that the polymer binder is not degraded) and kept there for a few minutes until the desired amount of the chromogenic material has been absorbed by the layer, including the image area. During this period of charging the layer with the chromogenic material, the background is subjected to the liquid solvent, and the non-light-activated photochromic material in colorless form may be dissolved out incrementally, leaving the background, to that extent, ineffective for further use. The slide then is dried and heated if necessary to finally conclude the acid-base reaction in the image area.

EXAMPLE III

In this example, the whole slide of Example I is exposed to the specified ultraviolet light to form a photochromic color over the entire intended recording surface. The proposed image area then is irradiated in the selected part of the totally-colored area in terms of green light, which converts the photochromic material in that image area to the colorless form. The process is completed with exposure of the layer to the specified $SO_2$, followed by heating, if necessary. The background of the image area is colored by the acid-base reaction color of the chromogenic material, whereas the image area is clear. It is to be noted that the image is inverted in the sense that it is not colored by the chromogenic color, but the background is so colored.

EXAMPLE IV

This example uses the coated slide of Example I except that the slide is made in extended form lengthwise and is written on at a restricted area writing station, past which the slide is moved as desired. A movable ultraviolet light beam depicts data thereon in terms of a trace which may be projected by an optically-directed beam, as disclosed in British Patent No. 914,865, bearing the date of May 16, 1961, which patent was based on application for United States Letters Patent Ser. No. 658,696, filed May 13, 1957, now abandoned, by Ephraim Frei, Yehuda Hirshberg, and Gerhardt Schmidt. The British patent discloses means for controlling a trace beam of ultraviolet light directed at a photochromic-material-sensitized screen. The slide, after moving past the writing station and having received the image, enters a gas chamber supplied with $SO_2$ and emerges gas-fixed. If necessary, the slide then is passed over and in contact with a heated roller to quicken the reaction. If desired, the slide may be exposed to heated $SO_2$ to merge the steps of gas-exposure and heating, thus eliminating a separate heating step.

EXAMPLE V

This example utilizes a flexible substrate as a support for the novel coating, such preferably being of a tough layer of polymeric material of transparent, translucent, or opaque properties. The substrate material should not be deformed during the heating step; therefore, polyester films such as Mylar are preferred. The flexible nature of the substrate permits the making of extensive strips of record material which may be unrolled from a roll package for use and re-rolled for storage after the records have been made thereon by any of the means disclosed in Examples I to IV, including additions to the background of record data already fixed.

EXAMPLE VI

In this aspect of the invention, the layer of Example I, after being exposed to ultraviolet light for precursor photochromic image formation, is stored for future use as a temporary repository of data which may be turned into a permanent record if its utility is later established, or it may be allowed to return by passage of time to normal uncolored condition spontaneously under the influence of ambient heat energy or at will by applied light energy predominantly rich in the long visual wave length band of the spectrum, or by applied heat. Here the recorded data may be edited at will until fixed, and even then added to by recording on any unused background area.

The shelf-life of the precursor image may be prolonged by keeping the layer at extremely low temperature, as is well known in the art, as photochromic image decay is promoted by a rise in temperature and delayed by low temperature.

In the event that the recorded data is not to be kept, the entire non-fixed area of a series of recordings may be effectively erased by heating the layer to 100 degrees Fahrenheit for a short time.

EXAMPLE VII

A continuous sensitized strip may be recorded upon by ultraviolet light and passed in front of a fixing station, where the record may be fixed continuously or in desired locations, as a function of time or movement, by blowing against it, at the selected times or constantly, a stream of hot $SO_2$. In fact, the stream of $SO_2$, heated if desired, may be moved with respect to the slide to add data of position of the record across or lengthwise thereof in terms of whether it is to be fixed or not.

EXAMPLE VIII

An ordinary glass microscope slide is coated with a 10%, by weight, toluene solution of polystyrene having a molecular weight of about $2.15 \times 10^5$ (sold as "Styron 700" by Dow Chemical Company, Midland, Mich., United States of America), into which solution has been added 1%, by weight of a 3-aroyl-2-methyl chromone type of compound—namely, 2-benzyl-3-benzoylchromone—and 1%, by weight, N(2,5-dichlorophenyl) leucauramine. The dried coating preferably should be within the specified thickness of .001 to .003 of an inch. This slide is exposed, in the desired areas, to ultraviolet light quantitatively rich in the 3660 angstrom spectrum region until the image appears orange in incident white light. This may take a fraction of a second or longer, depending on the energy received from the ultraviolet light source. This orange image persists for a time, reckoned in tens of hours, depending on the ambient room temperature (20 to 25 degrees centigrade) and before reversion to the colorless state is exposed to $SO_2$ gas, as by immersion of the slide in a breaker supplied with a flowing supply of the gas. Fixation of the image is completed as shown in Example I.

In all of the foregoing examples, the use of a reactant gas is a common factor. The use of vapors of iodine and boron trichloride will accomplish the same end, and it is supposed that other weak acid-forming gases will also serve the same purpose.

It is evident that the invention is adapted to the so-called "add-a-frame" type of recording, with the supplementary feature of selective erasure. The "add-a-frame" feature is inherent because the background area of a layer is still sensitive to ultraviolet light even though a permanent acid-base-derived permanent image area has been produced. The erasure feature is provided by the persistence of the photochromic image for a period of time in a temperature-reversible or light-reversible state if not fixed by the reactant gas, and, during that persistent period, observance of the image is possible to check whether it should be erased in whole or in part by heat or light, or saved in whole or in part by being fixed with the reactant gas.

The compression of the processing steps into a single environment does not change the order in which the process events occur. In a hot $SO_2$ environment with the layer of Example I, the only active operator-initiated step, aside from the provision of the environment, is the projection of the ultraviolet light into the slide in the selected data-recording areas. The steps of reactant gas-photochromic material complex formation and acid-base conversion of the chromogenic material as aided by heat occur in consecutive order, molecule by molecule, in a manner that may not constitute separate steps, as one molecule of the acid-base reaction product may be formed before the last photochromic molecule has been struck by a photon, so the invention is claimed both as an environmentally-induced process initiated by ultraviolet light where a complete process environment has first been provided, and on the other hand as a series of separately-initiated and consecutive steps performed one at a time, each initiated by a change in the environment (radiation, atmosphere, heat).

What is claimed is:

1. A record material consisting of a thin film of polymeric material having molecularly dispersed in it, in reaction proximity, both photochromic material taken from the group consisting of benzo-indolinospiropyrans and 3-aroyl-2-methylchromones colorable by ultraviolet light and in that colored state susceptible of reacting with an electron-acceptor gas taken from the group consisting of $SO_2$, $I_2$, and boron trichloride to form a complex which acts as a weak acid, and molecules of basic chromogenic material which will react with said weak acid to form color.

2. A record material like that in claim 1 which has been subjected to a pattern of ultraviolet light to form an image area pattern and then subjected to the electron-acceptor gas to convert the photochromic material in the image area to the weak acid complex.

3. A record member comprising a thin film of polymeric material having molecularly dispersed in it in reactant proximity both photochromic material taken from the group consisting of benzo-indolinospiropyrans and 3-aroyl-2-methylchromones colorable by ultraviolet light and colorless basic chromogenic material colorable on undergoing acid-base reaction, the polymeric material being traversable by ultraviolet light and permeable in thin films by a gas taken from the group consisting of $SO_2$, $I_2$, and boron trichloride, the ultraviolet-struck photochromic material in gas-treated form acting as an acid.

4. The record material of claim 3 having areas of data recorded thereon by applying to said areas ultraviolet light to convert photochromic molecules in the said areas to the colored form, the recorded data being subject to a fixing step by treatment with a reactant gas taken from the group consisting of $SO_2$, $I_2$, and boron trichloride.

5. The record material of claim 4 in which the photochromic molecules colored by the irradiation have been converted to a chemical complex product with a gas taken from the group consisting of $SO_2$, $I_2$, and boron trichloride.

6. The record material of claim 5 in which the complex has reacted with the proximate chromogenic material molecules to produce a colored reaction product.

7. The record material of claim 4 in which the colored photochromic molecules have been fixed by cooling the layer.

8. The process of making a permanent image in a thin film of polymeric material having dispersed in it ultraviolet-light-responsive molecules of photochromic material taken from the group consisting of benzoindolinospiropyrans and 3-aroyl-2-methylchromones and molecules of substantially colorless basic chromogenic material yielding a colored product upon undergoing acid-base reaction, comprising the step of subjecting the film in selected areas to ultraviolet light in the presence of a gas taken from the group consisting of $SO_2$, $I_2$, and boron trichloride which renders the image acidic.

9. The process of claim 8 in which the environment after treatment with the gas is adjusted to a temperature up to above 200 degrees Fahrenheit to increase the reaction rate of the chromogenic material.

10. The process of making a permanent image on a thin film layer of polymeric material traversable by ultraviolet light and having dispersed in it, in reactive proximity, molecules both of photochromic material taken from the group consisting of benzo-indolinospiropyrans and 3-aroyl-2-methylchromones and of basic substantially colorless chromogenic material which yields a colored product on undergoing an acid-base reaction, including the steps of
    (a) creating a photochromic image in the layer by applying ultraviolet light to selected areas of the film to represent data;
    (b) while the ultraviolet-light-induced image is extant, treating the film layer to a gas selected from the group consisting of $SO_2$, $I_2$, and boron trichloride to convert the photochromic material in the image area to a chemical complex product; and
    (c) supplying environmental heat to the layer to cause an acid-base reaction between the complex product material and the chromogenic material molecules in the image area to produce the image in terms of a colored product generated from the chromogenic material.

11. The process of recording data in a film of polymer material having molecularly dispersed in it ultraviolet-light-responsive photochromic material taken from the group consisting of benzo-indolinospiropyrans and 3-aroyl-2-methylchromones and acid-responsive colorless basic chromogenic material taken from the group consisting of leucauramines, acyl auramines, Rhodamine B Lactams, styryl quinoline dyes, and 4,4',4",4"'(oxymethylidene) tetrakis (N,N dimethyl analine) which yields color when in chemical proximity to photochromic material which has responded to ultraviolet light and in that state treated to an electron-acceptor gas, taken from the group consisting of $SO_2$, $I_2$, and boron trichloride comprising the step of subjecting the film to a record-representing pattern of ultraviolet light in an atmosphere of an electron-acceptor gas.

12. The process of claim 11 in which the ultraviolet light is applied before the film is subjected to the gas.

13. The process of claim 12 in which the temperature of the layer is adjusted upwardly after treatment with the gas to increase the rate of chemical reaction between the photochromic material and the chromogenic material.

14. The process of claim 11 in which the temperature of the layer is adjusted upwardly after treatment with the gas to increase the rate of chemical reaction between the photochromic material and the chromogenic material.

15. A process of making permanent images, including the steps of
    (1) providing a layer of organic polymeric film material having dispersed in it molecules of photochromic material taken from the group consisting of benzo-indolinospiropyrans and 3-aroyl-2-methylchromones;
    (2) forming an image in the layer by irradiating it with a pattern of ultraviolet light in the pattern of a desired image;
    (3) fixing the photochromic image by subjecting it to a gas selected from the group consisting of $SO_2$, $I_2$, and boron trichloride to form an acid-like image product; and
    (4) immersing the layer in a solution of colorless basic chromogenic material taken from the group consisting of leucauramines, acyl auramines, Rhodamine B Lactams, styryl quinoline dyes, and 4,4′,4″,4‴(oxymethylidene) tetrakis (N,N dimethyl analine) in a solvent which will not substantially attack the layer, thereby bringing the acid image material into contact with the chromogenic material.

16. The process of claim 15 in which the slide after step (4) is removed from the solution and heated to elevate the temperature to enhance the color formation.

References Cited

UNITED STATES PATENTS 3,212,898  10/1965  Cerreta _____ 96—88
3,285,743  11/1966  Arguss _____ 96—88

J. TRAVIS BROWN, *Acting Primary Examiner.*

NORMAN G. TORCHIN, *Examiner.*

C. E. DAVIS, *Assistant Examiner.*